Figure 1:
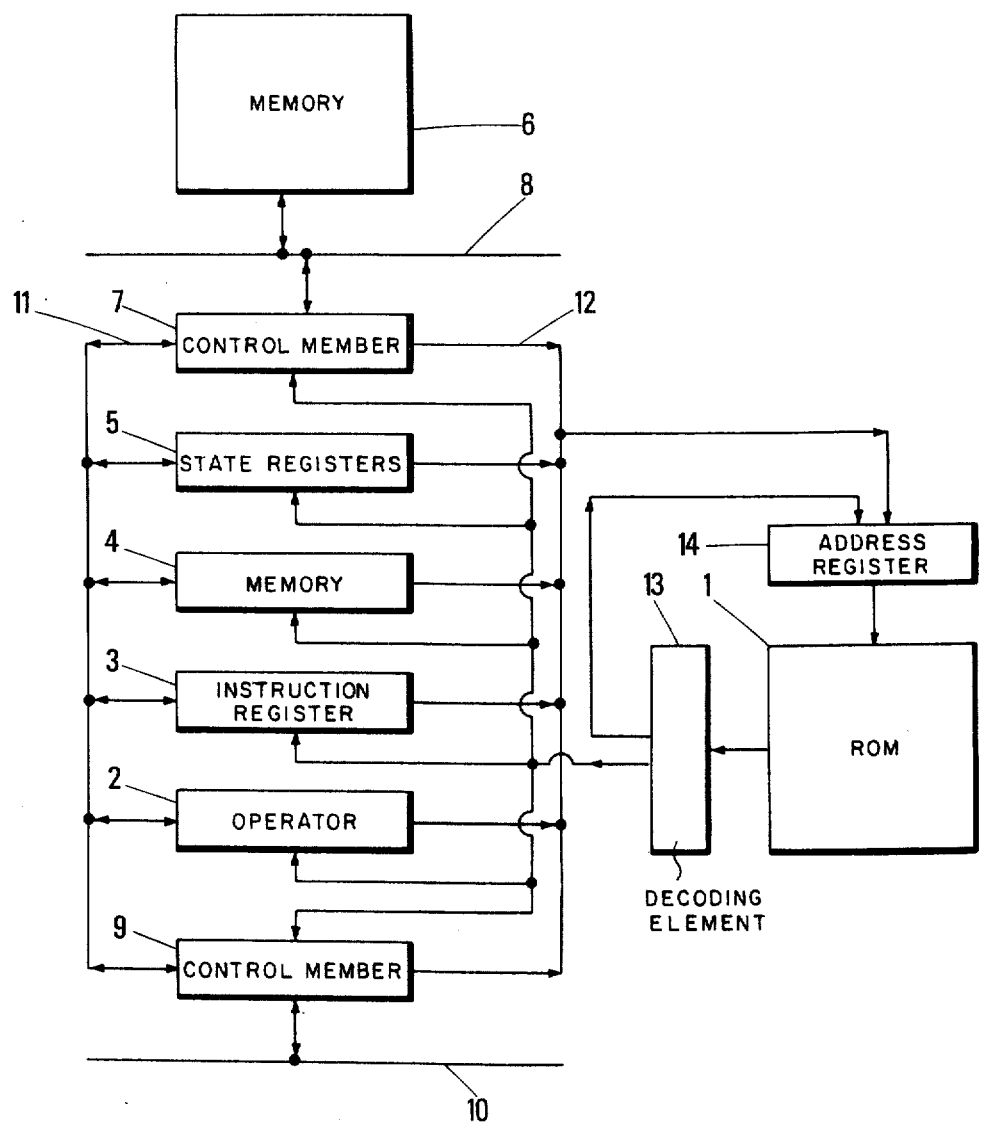

United States Patent [19]

Anceau et al.

[11] 4,007,444
[45] Feb. 8, 1977

[54] MICROPROGRAMMED COMPUTING DEVICE

[75] Inventors: Francois Anceau, Gieres; Claude Beauducel, Franconville; Pierre Courboulay, Paris; Jacques Cretin, Le Chesnay, all of France

[73] Assignee: Institut Francais du Petrole, des Carburants et Lubrifiants et Entreprise de Recherches et d'Activites Petrolieres Elf, France

[22] Filed: Nov. 13, 1975

[21] Appl. No.: 415,326

[30] Foreign Application Priority Data

Nov. 27, 1972 France .......................... 72.42157

[52] U.S. Cl. ............................................ 340/172.5
[51] Int. Cl.[2] .......................................... G06F 9/00
[58] Field of Search ................... 444/1; 340/172.5

[56] References Cited
UNITED STATES PATENTS

3,662,401  5/1972  Collins et al. ...................... 444/1
3,689,895  9/1972  Kitamura ....................... 340/172.5

*Primary Examiner*—Raulfe B. Zache
*Attorney, Agent, or Firm*—Craig & Antonelli

[57] ABSTRACT

Microprogrammed computing device comprising a data processing system, a central memory operatively connected thereto, means for exchanging data with peripheral devices, a system for controlling the execution of orders issued from the memory, a system for hierarchically classifying the tasks in a list and making the processing system available for the task having the first priority and a system for managing said list, means for testing the availability of said peripheral devices and means for adapting the processing system to each new task to which the first priority is given, whereby several computing and data exchange processes may be performed by the same device.

3 Claims, 3 Drawing Figures

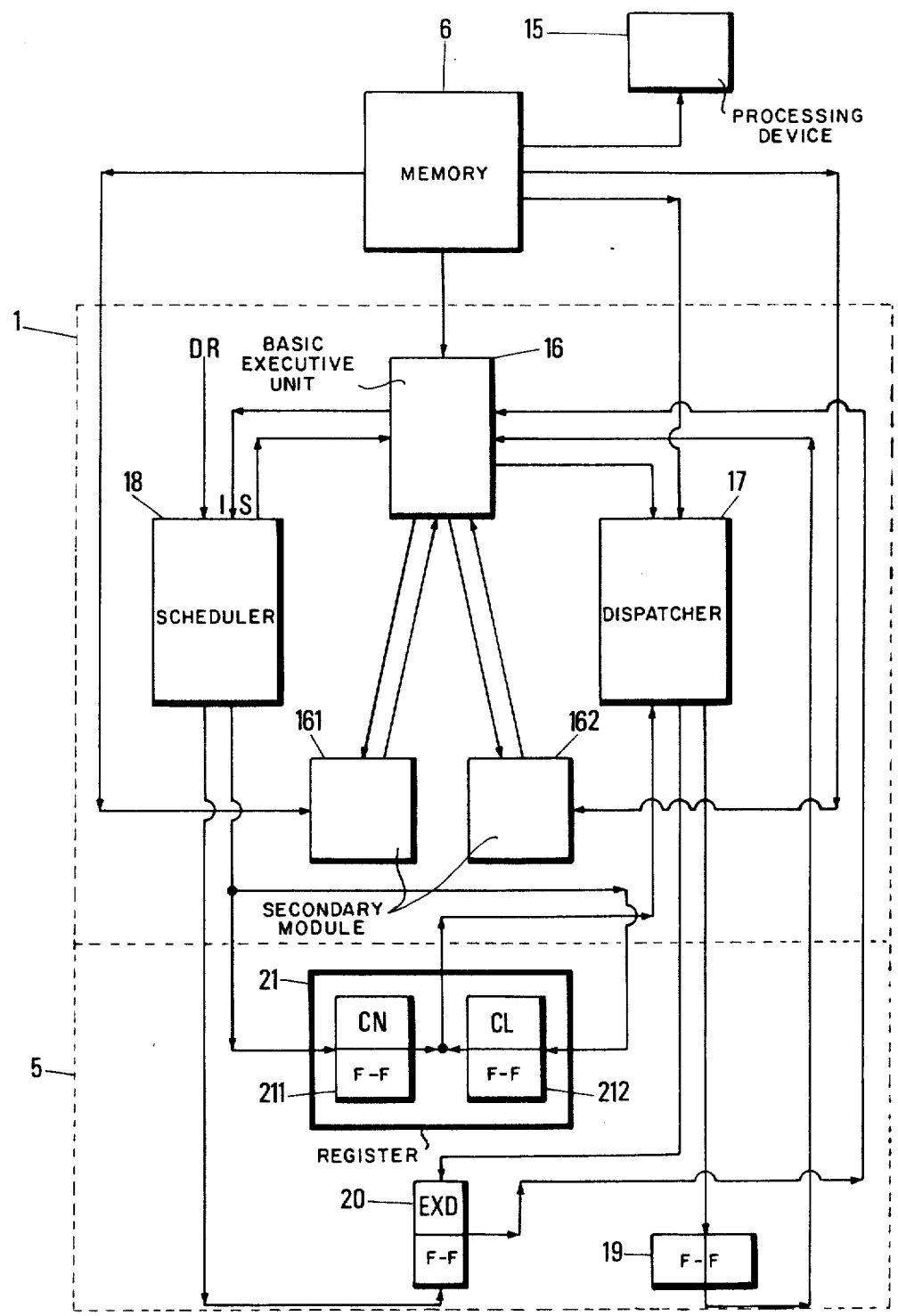

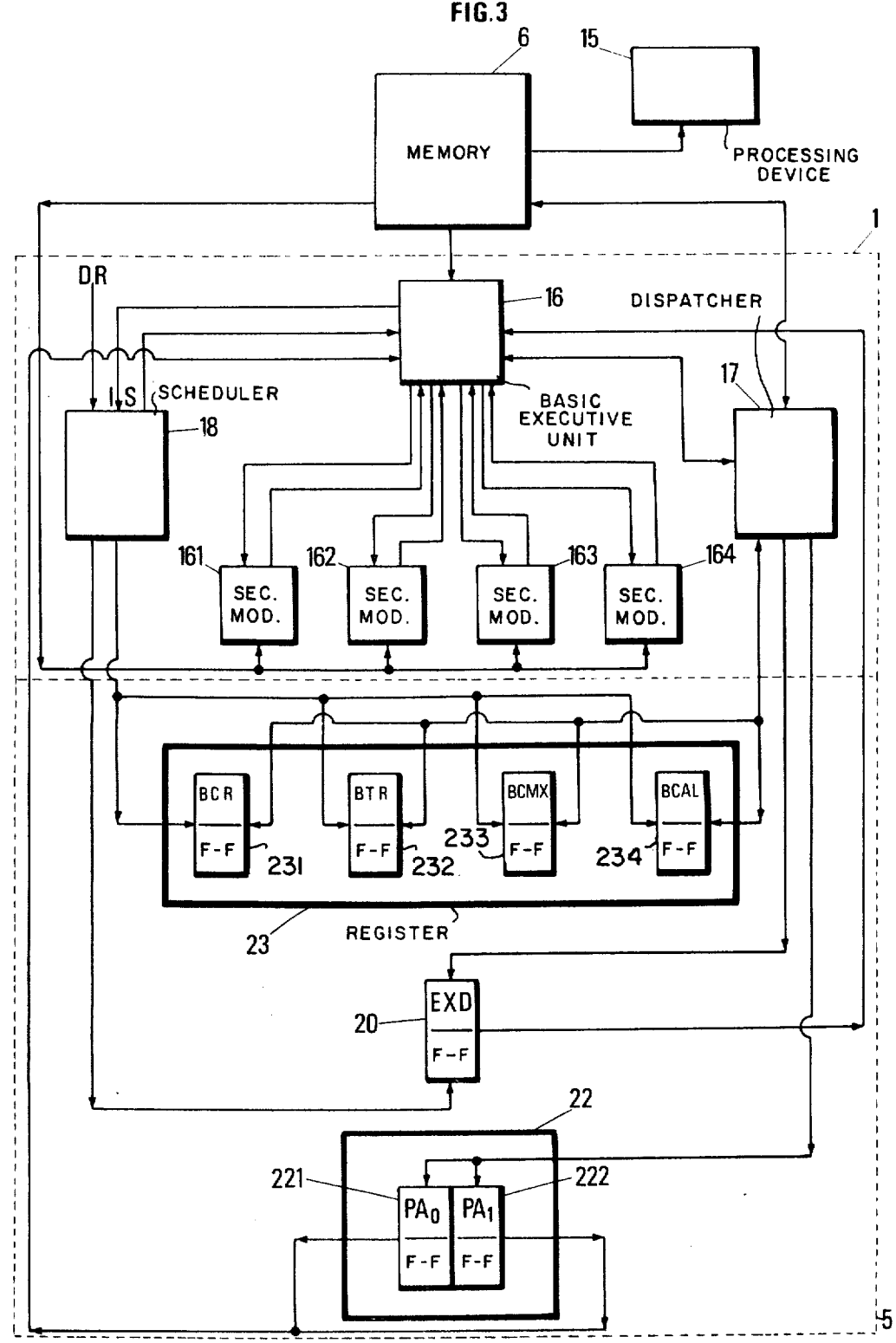

MICROPROGRAMMED COMPUTING DEVICE

This invention has for object a microprogrammed computing device. As a general rule, a computer comprises a computing unit or processing system which executes orders supplied by a central memory and exchanges informations with peripheral external devices through exchange units. Programs are subdivided in two types: the computing programs and the so-called "channel" programs which concern the conveyance to the computing unit of data issued from peripheral devices and the transmission of results to the same devices.

The transmission of elementary data from a peripheral device to exchange units and therefrom to the central memory is generally achieved by means of a logic device synchronizing the elementary exchanges between the computing unit and the peripheral devices and which is controlled by a microprogram. The total lack of synchronism between the computing unit and the peripheral devices makes it necessary to carry out transfers by blocks. The beginning of these transfers is controlled by the program, and the elementary exchanges inserted between two orders are treated by the synchronizing logic device. Accordingly, the stopping of the computer for waiting availability of external data is avoided.

The processing system may be used for other programs during the transfer period since the execution of the program requiring the transfer must be deferred until the data become available. But, conflicts arise quickly since the program which follows the interrupted one cannot also require a transfer of data from the same peripheral device. When a single processor is available, it becomes necessary to test the state of the peripheral device which is concerned by the transfer and to extend the testing period until the transfer operation is terminated. The operation of the computer may thus be discontinued as the result of a problem of exchange with peripheral devices.

This problem may be solved by using a computer arrangement whereby several different processes relating, for example, to computing operations or to operations relating to data transfer between the computer and any peripheral device can be achieved. For this purpose, the operation of the computer comprises using an assembly of specific microprograms, each adapted to manage a different process and which are called hereinafter "potential processors".

Each task will be define the association of a program conceived for carrying out certain processes with a control block in the central memory. This control block is also called "task describer" and consists of an assembly of words of the central memory which defines a task and control either the execution of said task or the preservation thereof in case of interruption.

For example, the first word of the task describer defines the type of process associated to the task by means of a binary digit. At the moment of execution, this digit will be transmitted to a state register of the computer and will be used as complementary binary digit of the operation code of the order to be executed. It is thus possible to have access to different order repertories according to the type of process to be executed and, for this purpose, two different processors are used with the same computing unit i.e., for example, a computing processor and a so-called "channel" processor.

The number of the potential processors may be increased at will, for example by associating such a processor to each channel for data transfer between a specific peripheral device and the computer. In such a case, each processor may be in one of the following states:
  available, i.e. having no program to execute,
  actuatable, i.e. waiting for the availability of the processing system for executing a program,
  active, i.e. using the processing system,
  in waiting condition, i.e. waiting until the end of a transfer and inoperative even if tasks are waiting to be performed.

The computing processor may also be in one of the above mentioned states, except in "waiting condition", and therefore can never be stopped for this purpose.

Each of the processors having access to the processing system, it is necessary to create a hierarchy between them.

It may be decided for example, that the channel processor has the priority over the computing processor.

The state of a processor is determined by a list associated thereto and which comprises at least one task which can be executed by said processor. Said task may be in one of the following states:
  available, which means that the corresponding operations are terminated or have not still started,
  actuatable, i.e. which is in the waiting list of its processor and cannot be carried out until the latter has terminated the task already in progress,
  active, i.e. being performed by its processor,
  in waiting condition, which means that its return to the waiting list of a processor will depend on one or more external factors.

Each active task may require the performance of other tasks. For example a computing task may require the performance of tasks requiring the use of channel processors, in which case said tasks will accumulate in the waiting list of the corresponding processors.

The operation of potential processors in a computing device thus requires a system for:
  creating a hierarchy between the processors and making the processing system available to the processor having priority,
  making waiting lists of the tasks associated to each processor and managing them.

The device according to the invention comprises a data processing system, a memory in relation with the processing system, means for exchanging data with peripheral devices according to at least one data transfer channel and a microprogrammed automatic device for controlling, on the one hand, the exchange processes performed through said transfer channel and the computing process and for managing, on the other hand, the tasks associated to the computing process and to the exchange processes.

The device is remarkable in that the automatic device comprises a first managing automatic system for controlling the performance of orders issued from the memory, a second automatic system for establishing a hierarchy between the lists of tasks associated with exchange processes of the same type or with the computing process and making the processing system available to the task heading the priority task list and a third automatic management system for making non hierarchized lists of the actuatable tasks associated with different processes of the same type.

This third system comprises means for actuating a first device memorizing the state of the lists of tasks associated to computing and exchange processes. It further comprises means for actuating a second memorizing device when one of said task lists will take the first priority.

The second automatic system comprises means for actuating a third device for memorizing the exchange process type or the computation being performed by the processing system. It further comprises means for testing the first memorization device and granting the processing system to the task heading the priority task list through the first managing system. This latter comprises means for controlling the actuation of the third automatic managing system and means for testing the second and the third memorizing devices.

The device according to the invention has the advantage of:

a simplification of the synchronization between the various units of the automatic microprogrammed device,
an increase in the rapidity of performing calls between programs,
the interruption at will of a process being performed, while continuously memorizing the report of activity of the different modules of units.

Other particular features and advantages of the invention will be made apparent from the following description of a non limitative specific embodiment of device, given by way of example, with reference to the accompanying drawings wherein:

FIG. 1 is a diagrammatical view of an embodiment of a microprogrammed computer,

FIG. 2 diagrammatically shows the automatic management device and the devices for memorizing the state of the modules of said management device in an arrangement comprising two potential processors, and FIG. 3 diagrammatically shows the managing automatic device and elements for memorizing the state of the units of said device in an arrangement comprising four potential processors.

The microprogrammed computer illustrated in FIG. 1 comprises a control member consisting of a "dead" or "read only" memory 1 where the microprograms are registered, and arithmetic and logic computing unit consisting of an operator 2, a register 3 for instructions and a memory with registers 4, an assembly 5 of state registers, a central "alive" memory 6, a member 7 for controlling the alive memory, communicating therewith through a bus memory cable 8, a member 9 for controlling the data transfer between the computer and the peripheral devices, not shown, through a bus cable 10.

The exchanges between the different elements of the computer are achieved through an internal bus cable 11. A bus cable 12, called test cable, connects also the different elements to the dead memory and conveys thereto data relating to the state of the computer in different points, giving means for linking up sequentially the issued micro-instructions.

The dead memory is associated to an element 13 for decoding the issued micro-instructions and also connected to the different units of the computer.

An address register 14 is connected to the output of the decoding unit 13 and to the test bus cable 12. It controls the delivery of micro-instructions from the dead memory 1 in the order of the successive addresses contained therein. The words of the dead memory are divided in groups of binary digits or "fields" having each a well-determined function. In particular, one of these fields is devoted to the control of the address register 14 and comprises one "word" indicating the partial address or "immediate value" which is transferred to the address register. It further comprises one order destined to one of the elements of the computer impelling it to transfer to the address register 14, a binary digit (bit) representative of its state. This digit is a complement to the partial address or "immediate value" in order to form the new address of the microinstruction issued from the dead memory. This arrangement makes it possible to form conditional connections.

In particular, the performance of instructions transferred from the central memory 6 to the instruction register 3 will be carried out by successive tests of the binary digits of the operating code thereof. Similarly, different binary digits of the assembly 5 of the state registers will be in position of being successively tested.

The embodiment illustrated in FIG. 2 illustrates the case where the device comprises two potential processors, i.e. a computing processor and a channel processor.

The microprogram memory 1 is subdivided in three parts:

A block for performing standard instructions associated with the processing device 15 for interpreting and executing instructions issued from the central memory. This block comprises a main microprogram module 16 called "basic executive unit" and two special secondary microprogram modules 161 and 162 for executing orders relating specifically to anyone of the processors of the device. The three modules are connected to the main memory 6. Both secondary modules 161 and 162 are controlled by the main module and transmit signals thereto when the instructions given to them have been executed on their corresponding processors;

a block 17 consisting of a microprogrammed automatic system for establishing a hierarchy between the processors or even between the lists of tasks respectively associated therewith and for making the processing system 15 (computing unit), formed by the operator 2, the instruction register 3 and the memory with registers 4 (FIG. 1), available for the processor having priority (dispatcher), and a block 18 consisting of an automatic microprogrammed system for establishing waiting lists of the actuatable tasks associated to each processor and managing the same (scheduler).

The block 17 is connected to memory 6 and to the basic unit 16 when the latter includes in its microprogram a "system" instruction IS, i.e. an actuating instruction relating to one or more tasks to be executed.

The management block 18 is arranged in order to permit a maximum use of the computing system and in particular the creation of a hierarchical system of the tasks. It includes means for temporarily deferring a task, excluding the same from the waiting list and including it again subsequently.

Among the tasks contained in a waiting list, some of them may have been the object of separate demands. They are called "resource demands". In order to take into account the successive demands, the management block 18 comprises means for memorizing the same in the "describer" of the relevant task.

The management block 18 also comprises a system for detecting an instruction indicating the end of the operations relating to a task and for excluding or reincluding the same in accordance with the fact that all the successive resource demands have or not been satisfied. In the case where a task which is different but assumed by the same processor, is demanded, the task management block 18 comprises means for introducing the describer of said task in the waiting list.

The assembly 5 of state registers comprises a first bistable flip-flop 19 controlled by the block 17. Each stable state of said flip-flop is associated to one of the two processors. The main module 16 of the executing block is adapted to control at each moment the state of said flip-flop 19. The assembly 5 also comprises a second flip-flop EXD (20) actuated by the block 18 and by the block 17 aand a register 21 consisting of two bistable flip-flops CN (211) and CL (212) also actuated by the management block 18.

The main module 16 of the executive block is adapted to control the state of the flip-flop EXD and the management block 17 comprises means for testing the state of both flip-flops CN and CL.

Each potential processor is defined by the assembly of a binary digit from register 21, a word of the main memory 6 which contains the address of the task describer of the first actuatable task which can be executed on the processor, the basic executive unit 16 and the secondary module 161 or 162 specialized for the processor. The latter is available when no address is present in the word of the memory.

The flip-flops 19, 20 and register 21 of the assembly 5 of the state registers provide for the synchronization of the different blocks of the microprogrammed memory 1.

The flip-flop 19 defines the active processor. It is triggered through block 17 to one or the other of its stable stages depending on the fact that the processing system is available either for the channel processor or for the computing processor. The flip-flop EXD (20) is actuated by the management block 18 when the latter has controlled the passage to the actuatable state of the processor having priority.

By testing flip-flop EXD, the base module 16 of the execution block detects any modification in the configuration of the actuatable processors and when a modification occurs, actuates the block 17 which establishes a hierarchy between the processors.

Flip-flops CN and CL of the register 21 respectively correspond to the channel processor and to the computing processor. They are respectively in one or the other of their stable states when the corresponding processors are respectively actuatable or not actuatable.

The synchronization mechanism is then very simple. The block 18 of task management when actuated by an external resource demand DR or by a system instruction IS, i.e. an actuating instruction relating to one or more tasks to be executed, puts them in order. The arrival of an instruction IS, relating to a task attributed to an available processor, makes the latter actuatable. In this case, the management block 18 memorizes the change in the corresponding flipflop of the register 21. When, in addition, the new actuatable processor has priority over the active processor, the management block 18 triggers the flip-flop EXD (20) and gives the control to the basic executive unit 16. The latter tests the flip-flop EXD and transfers the control to the management block 17 which discontinues the execution of the task being performed and controls the transfer of the content of the registers of the local memory 4 (FIG. 1) to the unit of memory 6 attributed to the block controlling the task which has been interrupted. It proceeds to the test of flip-flops CN and CL of register 21 and thereafter determines the task at the top of the task list associated to the new actuatable processor and actuates the flip-flop 19 for memorizing the nature of the processor to which the processing system is attributed. It subsequently controls the transfer of a certain number of words taken from the control block of the new task (context) to the registers of the local memory 4. In particular one of said words is transferred to the ordinal counter thereof. This latter operation is usually called "initialization". The management block transfers again the control to the basic executive unit 16. The latter controls the reading of the ordinal counter and the reading of the corresponding order and transfers the latter to the order register 3. It proceeds to test of the flip-flop 19 for interpreting the code of the order contained in the order register 5 either as an order relating to computation or as a "channel" order relating to a data transfer.

When all the operations corresponding to this new task having priority is terminated, the basic executive unit 16 transfers the control to the management block 17, which again controls the transfer of the content of the block controlling the task which has been interrupted to the registers of the local memory.

The execution of the interrupted task may then be performed again.

The device of FIG. 3 comprises, as the preceding embodiment, a central memory 6 and a microprogrammed memory consisting of a management block 17 for establishing a hierarchy between the processors and making the processing system 15 available for the processor having priority, a management block 18 for establishing the waiting lists of the tasks associated to each processor and managing the same and a block for execution of standard instructions. The latter is adapted to the case where the device comprises four potential processors. This device may include for example a channel processor CR adapted for a quick transmission of data, a processor TR adapted for real time computation, a channel processor CMX adapted for the process of multiplexed information and a computing processor CAL.

The execution block comprises a main microprogram module 16 called "basic executive" unit and four specialized secondary microprogram modules 161, 162, 163 and 164 for executing instructions concerning specifically one of the processors associated to the device.

The assembly 5 of state registers comprises a single flip-flop 20 identical to that of FIG. 2, actuated by the block 18 and tested by the main module 16. The nature of the active processor is defined by a register 22 comprising two associated bistable flip-flops PA O (221) and PA 1 (222). The four different binary numbers which can be represented therewith in association, respectively correspond to the four processors. Both flip-flops are also controlled by the management block 17 and tested by the basic executive unit 16.

It also comprises a register 23 with four bistable flip-flops BCR (231), BTR (232), BCMX (233) and BCAL (234) respectively associated to the four processors CR, TR, CMX and CAL. As precedingly, the stable states of the binary elements depend on the fact that their associated processor is actuatable or not. Each potential processor will also be defined by the assembly consisting of the state of the corresponding flip-flop of register 23, a word of the memory which contains the address of the describer of the first task which can be executed on this processor, the basic executive unit 16 and the specialized secondary module 161–164 for this processor.

The operation of the device is similar to that previously described. It would not be outside of the scope of the invention to provide the device with any number N of potential processors. In this case, the execution block will comprise N secondary modules, the register 23 defining the actuatable processor will comprise N binary digits and the nature of the active processor will be defined by n coupled bistable flip-flops, n being given by the relationship $n = \log_2 N$.

What we claim is:

1. In a microprogrammed computer having a data processing system, a central memory connected with the processing system, means for exchanging data with peripheral devices through at least one data transfer channel, and a microprogrammed device comprising a read only memory, the read only memory being provided with a set of microprograms wherein at least a first microprogram serves for controlling the execution of instructions issued from the central memory, a second microprogram serves for establishing a hierarchy between the lists of tasks associated with exchange processes of the same type or with the computing process and making the processing system available for the task heading the priority task list, and a third microprogram serving for establishing non hierarchized lists of actuable tasks associated with different processes of the same type, the improvement comprising state resistor assembly means including a first memorizing means connected with the second and third microprograms for memorizing a signal from the third microprogram indicating the state of the task list associated with the computing and exchange process and providing an output indicative thereof to the second microprogram, a second memorizing means connected with the first, second and third microprograms for memorizing a signal from the third microprogram indicating that an actuable list of tasks takes priority with respect to an active task list and providing an output indicative thereof to the first microprogram, and a third memorizing means connected with the first and second microprograms for memorizing a signal from the second microprogram indicating the type of exchange or computing process being performed by the processing system and providing an output indicative thereof to the first microprogram.

2. A microprogrammed computer according to claim 1 wherein the third memorizing means comprises a binary register whose maximum content is at least equal to the number of the types of processes, and the first memorizing means comprises a plurality of bistable flip-flops at least equal to the number of the types of processes, the second memorizing means comprising a flip-flop.

3. A microprogrammed computer according to claim 1, wherein the at least first microprogram of the read only memory includes a main microprogram for control of the execution of general operations relative to instructions issued from the central memory and at least one secondary microprogram connected to the main microprogram, each of the secondary microprograms serving for controlling the execution of specific operations relating to a particular computing or exchange process.

* * * * *

UNITED STATES PATENT AND TRADEMARK OFFICE
CERTIFICATE OF CORRECTION

PATENT NO. : 4,007,444
DATED : February 8, 1977
INVENTOR(S) : Francois Anceau, et al.

It is certified that error appears in the above-identified patent and that said Letters Patent are hereby corrected as shown below:

Title page, (73) Assignee, which now reads:

"(73) Assignee: Institut Francais du Petrole, des Carburants et Lubrifiants et Entreprise de Recherches et d'Activities Petrolieres Elf, France"

should now read:

--(73) Assignee: Institut Francais du Petrole, des Carburants et Lubrifiants, France--

Signed and Sealed this

Eighth Day of May 1979

[SEAL]

Attest:

RUTH C. MASON
Attesting Officer

DONALD W. BANNER
Commissioner of Patents and Trademarks